United States Patent [19]

Baker

[11] Patent Number: 4,636,318

[45] Date of Patent: Jan. 13, 1987

[54] CHEMICAL REFORMER

[76] Inventor: David L. Baker, 100 S. Home Ave., Oak Park, Ill. 60302

[21] Appl. No.: 661,342

[22] Filed: Oct. 16, 1984

Related U.S. Application Data

[63] Continuation of Ser. No. 622,708, Jun. 20, 1984, abandoned, which is a continuation-in-part of Ser. No. 560,520, Dec. 12, 1983, abandoned.

[51] Int. Cl.$^4$ .................. C10B 57/04; C02F 11/10
[52] U.S. Cl. ................................ 210/766; 210/769; 210/774; 201/20; 201/25
[58] Field of Search ............... 210/769, 774, 749, 751, 210/766, 761; 201/2.5, 20, 25; 208/8 R

[56] References Cited

U.S. PATENT DOCUMENTS

| | | | |
|---|---|---|---|
| 3,595,742 | 7/1971 | Hess et al. | 210/774 X |
| 3,733,255 | 5/1973 | Appell et al. | 201/25 |
| 3,875,357 | 4/1975 | Foster et al. | 210/774 X |
| 4,013,516 | 3/1977 | Greenfield et al. | 210/774 X |
| 4,078,973 | 3/1978 | Choi et al. | 201/25 X |
| 4,097,378 | 6/1978 | St. Clair | 210/774 X |
| 4,147,593 | 3/1979 | Frischmuth et al. | 201/25 X |
| 4,289,625 | 8/1981 | Torman et al. | 210/774 X |
| 4,321,150 | 3/1982 | McMullen | 210/769 |
| 4,321,151 | 3/1982 | McMullen | 210/769 |

Primary Examiner—Tom Wyse
Attorney, Agent, or Firm—Garrettson Ellis

[57] ABSTRACT

A method and system of continually reforming sewage and other organic materials into liquid oils and gases by pyrolysis using the contained and entrained water in the inorganic and organic constituents of the sewage.

21 Claims, 8 Drawing Figures

CHEMICAL REFORMER

RELATED APPLICATIONS

This application is a continuation in part of the U.S. application of David L. Baker, Ser. No. 622,708 filed June 20, 1984, abondoned which, in turn, is a continuation in part of U.S. application Ser. No. 560,520, filed Dec. 12, 1983, abondoned.

BACKGROUND OF THE PRESENT INVENTION

In the U.S. alone there are approximately 50,000 tons of semi-dry sewage sludge produced daily in the U.S. and the treatment, disposal and use of this material presents a major problem to this country on national, state and local levels.

For the most part, sewage sludge has been disposed of after treatment, as opposed to any reformation process producing commercially viable by-products. This disposal includes incineration, landfill, lagooning, stockpiling, ocean-disposition and land-spread. Disposal, however, while commonly practiced, is quite expensive and environmentally dangerous in many applications.

Incineration is generally found uneconomical because of the high cost of incineration and ash disposal equipment and the relatively low net heat yield. Incineration to be productive requires pre-drying the sludge but the equipment costs are exhorbitantly high and the gaseous discharges are unacceptable for most community environments.

There have been a wide variety of purely experimental systems developed for the pyrolysis of sewage sludge, but they have been without exception economically unjustifiable as a method of disposing of the sewage by-products.

One such project involved the experimental conversion of sewage sludge to oil by hydroliquefaction at the Worcester Polytechnic Institute in 1983. These experiments, however, are not acknowledged by applicant to be prior art since applicant's system and process were reduced to practice prior to this work conducted by Wilmer L. Kranich at Worcester Polytechnic Institute, and his experiments are being noted in this background solely for the purpose of acknowledging contemporaneous activity in hydrogenation of sewage sludge and the problems noted in this contemporaneous activity.

In 1983 Mr. Kranich performed hydroliquefaction experiments with sewage sludge using two methods (1) an in situ (batch) hydrogenation on as-received aqueous suspensions of sewage sludge, and (2) the hydrogenation of dried samples in an oil carrier in situ (also a batch experiment). The only special preparation of the as-received raw materials was to stir the raw contents of a sample to obtain an as representative sample as possible. The dried samples were prepared in two ways; the first involved direct low temperature (below 100 degrees C.) drying in a nitrogen atmosphere to avoid oxygenation by air. In the second method the sludge was first dewatered in the laboratory centrifuge and the supernatant discarded before drying. The difference in the results caused by the presence of the dried dissolved salts was not measurable within the limits of accuracy of the experiment. The dried material was ground to a fine powder and slurried in carrier oil in the second method.

In the oil carrier runs, a slurry of dried powdered sludge was dispersed in an anthracine or paraffin oil in a small beaker, warmed to a free-flowing mixture, and with an added catalyst was placed in an autoclave. Hydrogen from an external source under pressure was added to the autoclave until the initial reaction pressure was reached.

This dried sewage sludge was pyrolized at temperatures between 410 to 440 degrees C. with reaction times of 10 to 20 minutes in oil slurries.

The oil and gas content of the yields from Mr. Kranich's hydrogenation process was inconsistent and inclusive, because the amount of carrier oil lost in his calculations by conversion to gas resulted in a calculated yield greater than the total amount of dry sludge converted, acknowledged by Mr. Kranich to be "an impossible result".

As an alternative to immersing the sewage sludge in an oil carrier, Mr. Kranich also attempted batch pyrolysis with sewage sludge using a water-sewage sludge slurry without the addition of any carrier oil. He hypothesized that the pyrolysis of this slurry would produce hydrogen that ideally may produce hexane $C_6H_{14}$ but his experiments were a total failure in that no such results occurred. Again the entire hypothesis of Mr. Kranich's experiment was the addition of externally stored hydrogen.

Mr. Kranich concluded, based upon his experiments, that the conversion of dried sludge slurried in oil was not economically feasible in view of the large equipment and operating costs for pre-drying the sludge and therefore his subsequent experiments were directed to batch testing a water slurried sewage sludge without any oil carrier whatsoever. The results of these latter experiments did not indicate any significant hydrogenation because of the low temperature limitation, i.e. around 300 degrees C., imposed by the large amounts of carrier water.

It is a primary object of the present invention to ameliorate the problems noted above in the conversion of sewage sludge to oil. Also, the invention may be used to process a large variety of other organic waste products to generate oils and burnable gases.

SUMMARY OF THE PRESENT INVENTION

According to the present invention a method and system are provided for continuously reforming sewage or other organic materials into liquid oil, gases and other commercially useful by-products by pyrolysis in the presence of water, preferably at least about 10 weight percent of water, and typically 30, 40, or more weight percent water. This process typically uses an energy efficient reactor that elevates the temperature of an oil-based carrier and organic material such as undried sewage sludge mixture to the desired temperature, typically 700° to 950° F., for example 840° to 880° F., while controlling system pressure as desired, typically to a value of 700 to 2500 psi. Without wishing to be limited to any particular theory of operation of this invention, superheated steam produced by heating appears to react with the sewage sludge and products thereof. This apparently results in improved hydrogen production over prior known reactions, and often appears sufficient to cause substantially complete hydrogenation of the organic constituents in the sewage sludge or other organic waste products without requiring any external addition of hydrogen.

In another aspect of this invention, a continuous flow reactor is used in which the oil carrier-sewage sludge mixture after reaching its maximum temperature is passed into out-of-contact heat exchange relation with incoming mixture to pre-heat the incoming mixture by heat transfer, resulting in the output from the reactor being preferably not significantly above ambient temperature.

Toward this end the reactor includes one or more vertical pass counterflow exchange sections with incoming mixture passing vertically upwardly or downwardly through vertical baffles in out-of-contact heat exchange relation with hotter outgoing liquid mixture.

Another feature of the present invention is the provision of a mechanical exchanger that is a piston and cylinder device that transfers in impulse fashion incoming mixture to the reactor and reformed mixture from the reactor to subsequent separation stages.

In summary, one mixes an oil-based carrier with organic waste material, the waste material being undried, typically containing at least about 10 weight percent water and optionally much higher water quantities such as 40 to 60 percent or more. The amount of oil-based carrier present is sufficient to permit the mixture to be a more readily flowable material than the corresponding waste material free of oil carrier. One then pyrolyzes the flowable material at elevated temperature and pressure, to produce organic oils and gases in accordance with this invention. The oil-based carrier may be a hydrocarbon oil, for example heating oil.

The flowable material is preferably passed in a substantially continuous stream through a heating and pressurizing zone to produce liquid oils in the resulting heated, substantially continous stream. Thereafter, the heated, substantially continuous stream is passed through heat exchange means to recover heat and to transfer it to the substantially continuous stream prior to entry into the heating and pressurizing zone. Thus the operation achieves a great efficiency, despite the fact that high temperatures may be used. The heat of the system may be recycled, and thus relatively little heat is wasted.

It is typically desirable for the readily flowable material, particularly when it is a municipal waste product such as sewage sludge, to be pyrolyzed at a temperature of 700° to 950° F. and at a pressure of 700 to 2500 psi. The readily flowable material preferably contains from 60 to 90 weight percent of the oil carrier prior to pyrolysis.

For example, the readily flowable material containing the organic waste products may be exposed to pyrolysis at 750° to 900° F. and at a pressure of 800 to 1500 psi. for an average period of time exceeding 5 minutes in a continuous process. This average period of time is determined by simple average flow calculation, since material is constantly entering and exiting the pyrolysis zone.

As the result of this, organic waste products that have long caused environmental difficulties can be turned into useful oils and gases that may be burned for energy, or which may serve as lubricants, ingredients in other products, or chemical intermediates. For example, organic garbage, raw sewage, or waste paper may be processed. Surprisingly, much of the oils produced turn out to be hydrocarbons free of oxygen groups, and comparable to petroleum products. Also, the end product can be mostly oils, with little gas generation.

DETAILED DESCRIPTION OF THE PREFERRED EMBODIMENTS

Sewage sludge varies significantly from community to community across the country but digested sludge usually contains the following components: oils, 2 to 5%; asphaltenes, 2 to 4%; organic toluene-insolubles, 25 to 40%; ash 7 to 15%; and water 40 to 50%. An important aspect of the present invention is that the sewage sludge does not have to be dried from the above values prior to chemical reformation by pyrolysis.

Figure 1:
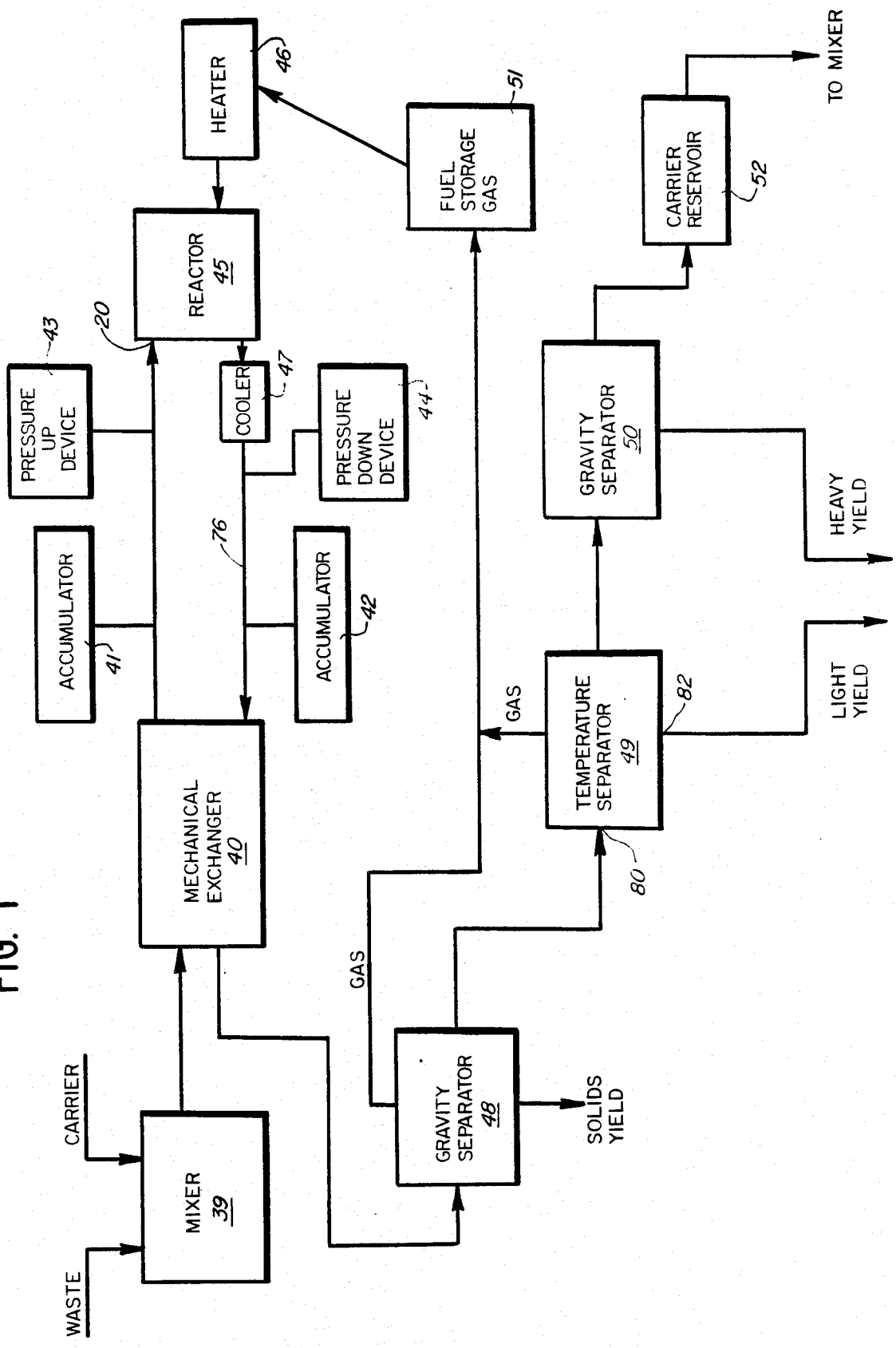
FIG. 1 is a schematic flow diagram of a present organic material reforming system.

Viewing FIG. 1, where the present system is shown schematically, mixer 39 mixes undried sewage sludge with an oil carrier as necessary, which may be essentially recirculated yield produced by the system. Of course, a system start-up carrier oil may be provided for initial start-up. Mechanical exchanger 40 both adds and withdraws equal volumes of the sewage sludge-carrier oil to and from reactor 45, taking fresh material from mixer 29 and conveying such material to reactor 45 in continuous but pulsating fashion. The accumulator 41 reduces the transient pressures produced by the pulsating action of the exchanger 40. Pressure up device 43 is a piston and cylinder device that regulates input pressure to reactor 45 at a desired level, typically less than 2000 psi.

In the reactor 45, the sewage sludge-carrier oil mixture is typically heated to approximately 840 to 880 degrees F. to produce the pyrolytic conversion of the organic constituents in the sewage sludge to oil and gas, apparently by hydrogenation in addition to the further reformation by hydrogenation of the carrier oil. In the reactor 45 the water changes to superheated steam, apparently providing an improved water/gas reaction with partial shift that provides hydrogen for the hydrogenation process.

Reactor 45 delivers its output to counterflow heat exchangers 21-23 (FIG. 4) that provide an output having a temperature only slighly above ambient. Cooler 47 acts as a safety device to reduce reactor outlet temperatures to avoid the excessive production of gases, and may be of conventional design, such as a chamber of cooling liquid through which flow channel or outlet pipe 76 passes. Pressure-down device 44 is a pressure regulator identical to pressure regulator 43 to regulate the outlet pressure from reactor 45. Accumulator 42 smooths the pulsating flow.

Mechanical exchanger 40 also receives reformed carrier oil-sewage sludge mixture from the reactor and transfers it to gravity separator 48, that separates remaining produced gases and solid yields consisting mostly of tar. The gravity separator is a spiral separator of conventional design, not shown in detail in the drawings, wherein liquid enters the outside and flows in a circular route to the center. During this period free gases collect at the top and are drawn off continously. Solids settle at the bottom and are removed periodically. Fluid from the center flows continuously out to temperature separator 49. Temperature separator 49 essentially produces the separation of lighter oils from the reformed mixture, and further separates any remaining gaseous components as yield which combines with the also volatile gaseous components from gravity separator 48, for delivery to a fuel storage reservoir 51, which may provide a fuel source for heater 46 or for other fuel purposes.

Gravity separator 50 of conventional design receives the heavier mixture components from temperature separator 49 and includes a spiral separator wherein flow enters from the outside and circles to the middle. The heavier oil and residue is drawn off the bottom, while the lighter yield from the top center is taken off as carrier to a carrier reservoir 52 from where it is recirculated to the mixer 39 as carrier oil liquid.

Figure 2:
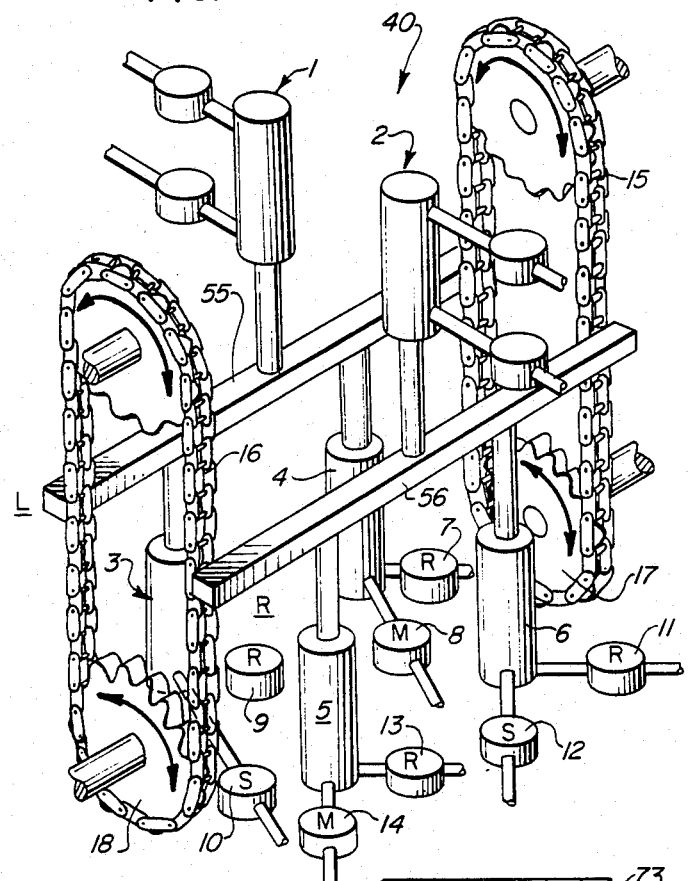
FIG. 2 is a perspective view of a mechanical exchanger illustrated schematically in FIG. 1.

The mechanical exchanger 40 illustrated in FIG. 2 is seen to include four piston and cylinder devices 3, 4, 5 and 6 having stationary cylinders and movable headless pistons or plungers driven in reciprocation by hydraulic cylinders 1 and 2 connected to the piston and cylinder devices 3, 4, 5 and 6 by bars 55 and 56. The bars 55 and 56 are connected at their ends to synchronizing chains 15 and 16 which assure 180 degree out-of-phase movement of cylinders 3 and 4 with respect to cylinders 5 and 6.

Cylinders 4 and 5 are connected to draw oil carrier-sewage sludge mixture from mixer 39 and deliver it to reactor 45, while cylinders 3 and 6 are connected to withdraw reformed mixture from reactor 45 and deliver it to gravity separator 48. Valves 7 and 13 are connected to the reactor inlet line and valves 11 and 13 are connected to the reactor outlet line. Valves 8 and 14 are connected to mixer 39 while valves 10 and 12 are connected to gravity separator 48.

When cylinder 1 extends and cylinder 2 retracts, bar 55 goes down and bar 56 goes up, and the following sequence results: Mixture in cylinder 4 is conveyed to the reactor through valve 7; mixture from the reactor is drawn into cylinder 6; mixture from the mixer 39 is drawn into cylinder 5; and reformed mixture in cylinder 3 is delivered to the gravity separator 48. On the reverse stroke with piston 2 extending and piston 1 retracting the following sequence occurs with cylinders 3 and 4 retracting and cylinders 5 and 6 extending: Mixture from mixer 39 is drawn into cylinder 4; reformed mixture in cylinder 6 is conveyed through valve 12 to gravity separator 48; mixture in cylinder 5 is conveyed to the reactor through valve 13; and reformed mixture is drawn into cylinder 3 from the reactor through valve 9.

The mechanical exchanger 40 allows an exchange of liquid mixture with reactor 45 without a volume change in the reactor 45. Because of this a minimum of horsepower is required to pass a given amount of liquid through the system.

The speed-up of the operation is easy to regulate with exchanger 40, and thus the amount of flow readily varies as required. The system valves 7, 8, 9, 10, 11, 12, 13 and 14 are automatically externally operated and are fully opened to reduce the abrasive effects of the passing mixture. If cylinders 3, 4, 5 and 6 include four two-inch rods with a 24-inch stroke at a 13-second cycle rate at a pressure of 1200 psi. and one-half horsepower motor driving a hydraulic pump, a 180 gallons per hour flow rate will be achieved. This is about one-sixth the horsepower required for a one-end-in/one-end-out operation.

Figure 3:
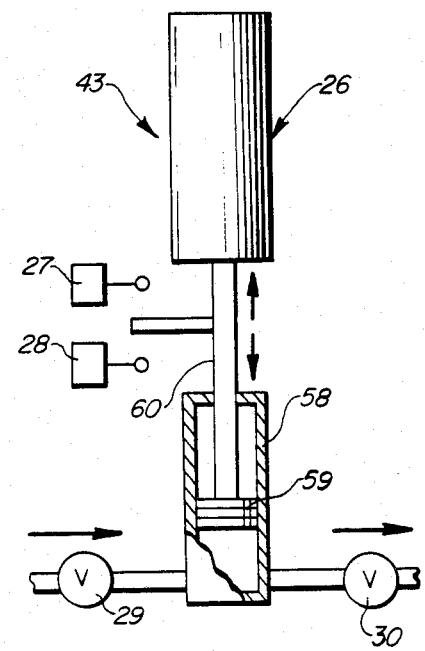
FIG. 3 is a fragmentary cross section of one of the pressure control devices for maintaining system pressure, illustrated schematically in FIG. 1.

Referring to FIG. 3 wherein the pressure up device 43 is shown in detail, it is seen to include a hydraulic cylinder 26 controlled by system pressure at the inlet to reactor 45. Cylinder 45 is connected to an accumulator cylinder 58 in which a piston 59 is reciprocably mounted on rod 60 driven by cylinder 26. The limits of movement of rod 60 and piston 59 are controlled by limit switches 27 and 28. When system pressure in reactor 45 falls below a predetermined value, e.g. 1000 psi., cylinder 26 will respond by moving piston 59 upwardly in cylinder 58, opening one-way valve 29 and filling cylinder 58. Cylinder 26 automatically reverses upon actuation of switch 27, causing piston 59 to travel downwardly in cylinder 58, causing one-way valve 30 to open which results in an increase in system pressure.

Figure 4:
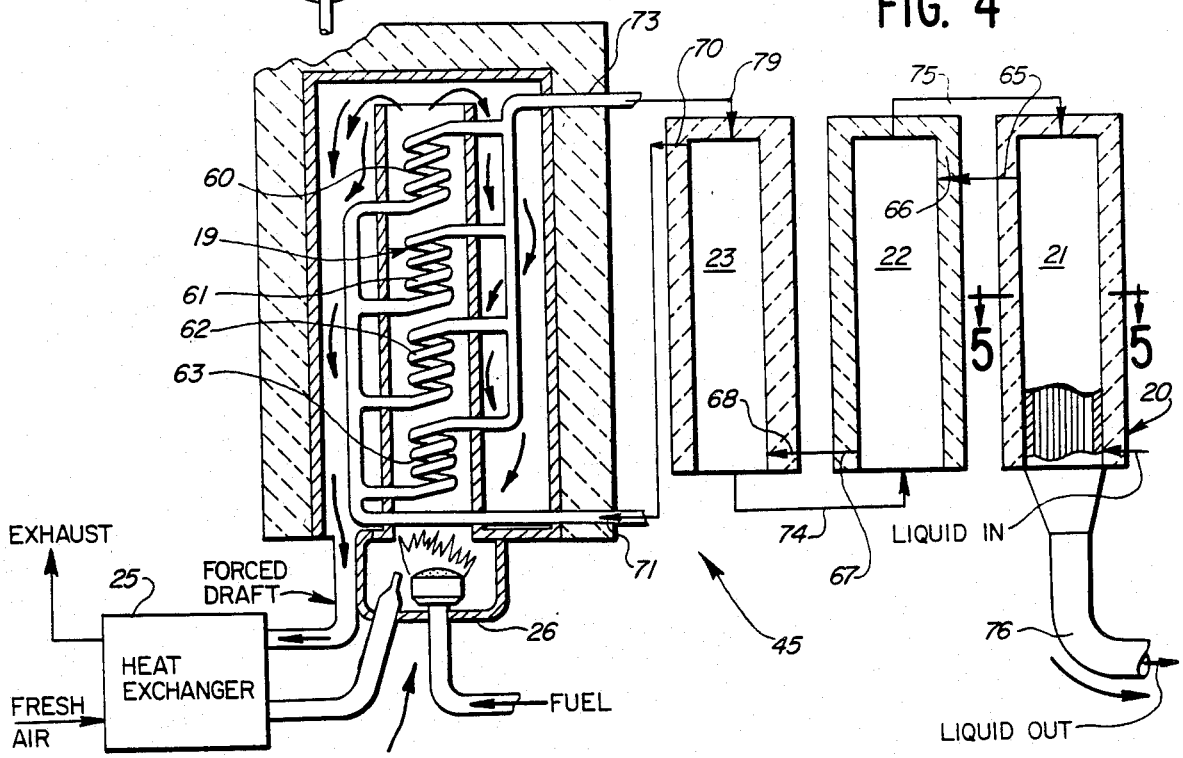
FIG. 4 is a partly fragmented view of a reactor illustrated schematically in FIG. 1 with its heater shown in cross section along with its three heat exchange sections.

As seen in FIG. 4, the reactor 45 and heater 46 consist of a heat exchanger 25, a heater section 19 and three identical vertical dual pass heat exchangers 21, 22 and 23. The heat exchanger 25 is a counterflow plate heat exchanger with a constant rate of air flow, determined by a blower through a heater box containing heater 19, whose four coils 60, 61, 62 and 63 transfer heat to the carrier oil-sewage sludge mixture passing through them. Heat is supplied by a burner 26 and start-up is supplied by electric heater rods. The air may be circulated at approximately 1000 degrees F. depending upon the rate of flow and the chemical load.

Mixture enters heat exchanger 21 from mechanical exchanger 40 at inlet 20, and then this mix passes upwardly in one pass of heat exchanger 21 to the top and then through outlet 65 to inlet 66 of heat exchanger 22 where it passes down to the bottom in one pass and exits at 67 to inlet 68 of exchanger 23. Mixture at inlet 68 passes up one pass in exchanger 23 to the top where it exits at 70, entering heater section inlet at 71 where it passes in parallel fashion through coil sections 60, 61, 62 and 63. Mixture at maximum temperature exits heater 19 at outlet 73 and enters inlet 79 of exchanger 23 from where it flows downwardly in out-of-contact heat exchange relation from inbound liquid. After pre-heating inbound liquid in exchanger 23, outbound mixture enters the lower end of exchanger 22 via line 74 and passes in out-of-contact heat exchange relation with inbound fluid therein. Thereafter the outbound liquid enters the top of exchanger 21 via line 75 and passes in out-of-contact heat exchange relation therewith and exits the reactor through outlet pipe 76 connected to return to mechanical exchanger 40.

Figure 5:
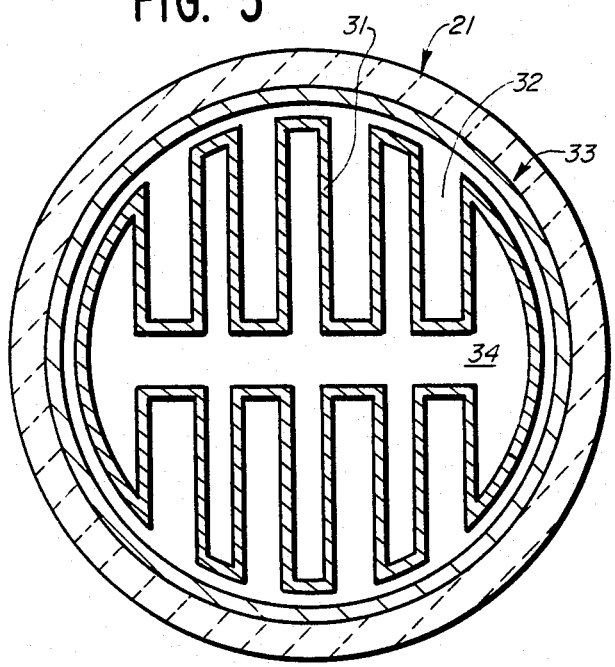
FIG. 5 is a cross section of one of the reactor heat exchange sections illustrated in FIG. 4 taken generally along line 5—5 therein.

FIG. 5 shows a cross section of each of the heat exchangers 21, 22 and 23 illustrated in FIG. 4. Each is seen to consist of a housing 33 and a separator 31 which divides the volume into two passes 32 and 34. Pass 32 is the inbound pass going from mechanical exchanger 40 to heater 19, and pass 34 is the outbound flow going from heater 19 to cooler 47. The corrugated shape of separator 33 gives a maximum of heat exchange area.

If system pressure due to an increased volume created by chemical reaction from the reactor 45 is too high, the pressure down device 44 will operate. Pressure down device 44 is identical to pressure up device 43 illustrated in FIG. 3. When the pressure down device 44 senses an increase in outlet pressure from reactor 45, the pressure down device will retract, withdrawing fluid from reactor 45, decreasing reactor pressure, and then will extend delivering the withdrawn fluid to the mechanical exchanger without imposing any backloading on the reactor 45 because of the effects of the check valves in the pressure down device 44, corresponding to the valves 29 and 30 in the pressure up device illustrated in FIG. 3.

Figure 6:
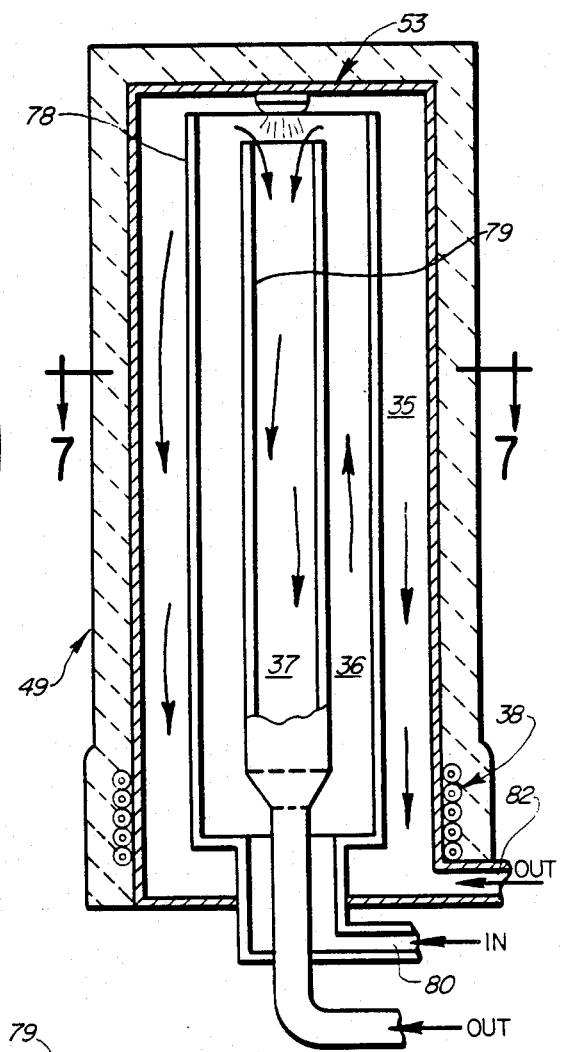
FIG. 6 is a longitudinal section of a temperature separator illustrated schematically in FIG. 1.
Figure 7:
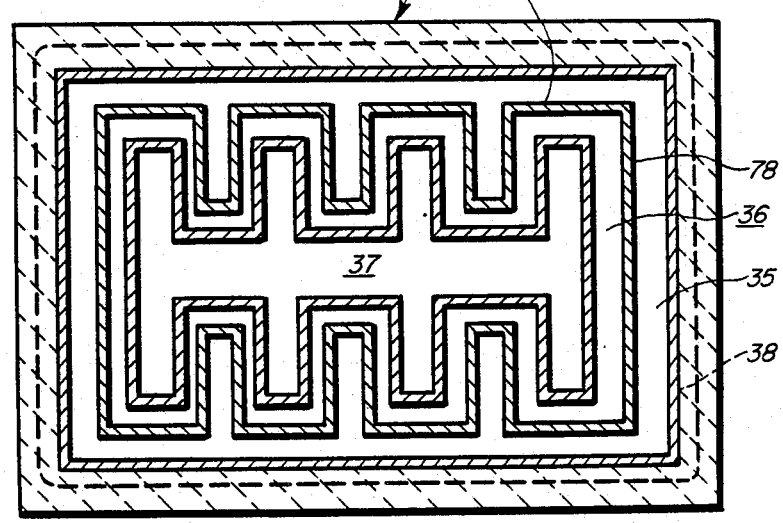
FIG. 7 is a cross section of the temperature separator taken generally along 7—7 of FIG. 6.

The temperature separator 49 is illustrated in FIGS. 6 and 7 and is seen to consist of three passes 35, 36 and 37 defined by spaced baffles 78 and 79, a heat source 53 and a cold plate area 38. Liquid enters inlet 80, seen in FIG. 6 and flows upwardly in pass 36 to the top, picking up heat as it flows, and at the top the flow of liquid descends in pass 37 since baffle 79 is shorter than outer baffle 78. The heat absorbed on the way up and at the top is exchanged to the upward flow in pass 36. At the top a temperature of typically 400 degrees F. is maintained by heater 53 which will vaporize the light ends of the oil yield which descend in pass 35, also giving up heat to inbound liquid flowing upwardly in pass 36 and condensing the remainder in the cold plate area 38.

Light yield flow from outlet 82 goes to a light yield storage, to be used as one of the main by-products of this system.

Figure 8:
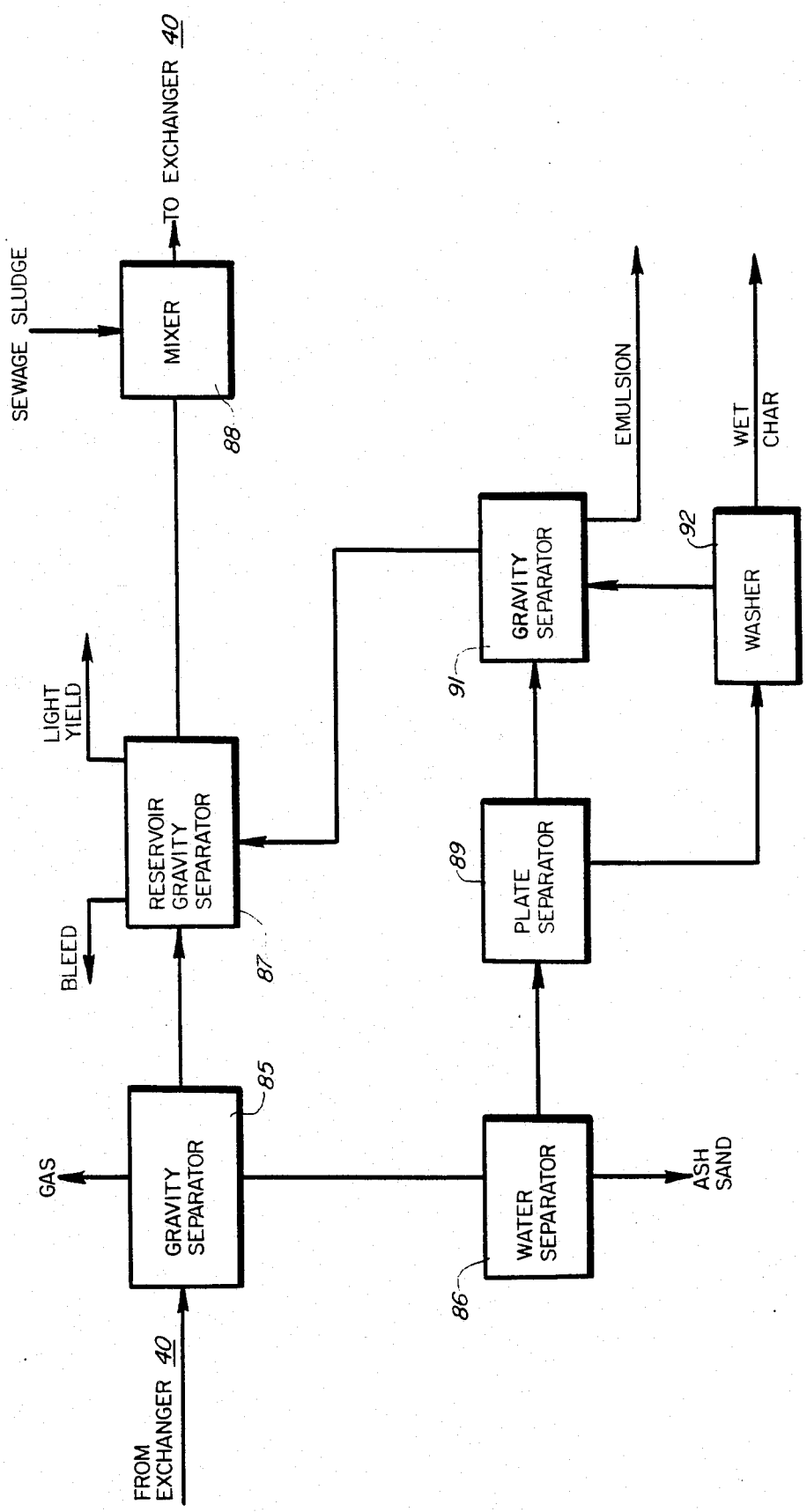
FIG. 8 is a schematic flow diagram of a modified form of the present invention including an improved separator system for separating the reformed mixture's constituent components.

In FIG. 8, I show a schematic diagram of another embodiment of the separator portion of the system illustrated in FIG. 1. Gravity separator 85 is a spiral gravity separator and receives reformed liquid from mechanical exchanger 40 and separates free gases at the top as a yield product. The solids at the bottom of separator 85 containing oil, char, sand, ash and emulsion are passed to water separator 86. The carrier mixture from the top of separator 85 contains about 5% char which can be used to take up with any excess water in the input material, and is passed to reservoir gravity separator 87. The gravity separator 87 contains a reservoir section that permits the increase in system volume produced through chemical reformation to be bled off in order to assist in maintaining system pressure. As the inventory builds up in the gravity separator 87 it can be removed and sent to a temperature separator (not shown) to separate the light ends for fuel. The lower carrier in the separator 87 is the heavier oil and will contain some char. This heavier carrier is passed through mixer 88 and permits the heavier oils to be recirculated as carrier and reformed to shorter molecules in the reactor 45, which of course is desirable.

The mixer 88 is a mechanical mixer and mixes the carrier in proper proportion to the input raw sewage sludge.

The water separator 86 agitates the solids from gravity separator 85 gently with water, resulting in sand and ash going to the bottom. The char in emulsion entrained in oil will float off the top and the exiting mixture to plate separator 89 contains about 5 to 10% char and 1 to 2% emulsion by volume.

The plate separator 89 is a gravity plate separator with horizontal flow across perforated plates which causes any particle falling through the plate to drop into a non-flowing zone that is pitched so these particles dropping undisturbed to the bottom may be removed through a water level. The resulting carrier from plate separator 89 contains only a small percentage of emulsion and is conveyed to gravity separator 91. The concentrate from separator 89 is char saturated with carrier and emulsion and exits the lower end of separator 89 to washer 92.

The gravity separator 91 is a spiral baffle gravity separator that separates the carrier and emulsion which is heavier than the carrier but lighter than water. The clean carrier from washer 92 is also delivered to the input of gravity separator 91 since it will continue to have a small amount of emulsion. The carrier free of char and emulsions flows from the reservoir of gravity separator 91 to the gravity separator 87 as additional carrier oil. The emulsion from gravity separator 91 is removed as yield.

The washer 92 is an intensive agitator which replaces the oil bound around the char with water, at which time it sinks in the water. The wet char is removed from washer 92 and can be conveyed to mixer 88 to be reformed to oil by pyrolysis.

Parts of the apparatus described above which are not described in detail herein may be manufactured and used in accordance with conventional technology known to those skilled in the art of hydraulic and chemical process equipment.

Accordingly, organic waste products, particularly municipal wastes such as undried sewage sludge, can be turned into a useful source of energy in the form of oils and burnable gases. The products of the process of this invention are also useful for other industrial purposes.

The above has been offered for illustrative purposes only, and is not intended to limit the scope of the invention of this application, which is as defined in the claims below.

That which is claimed:

1. The process of producing liquid oils from organic waste materials, which comprises: mixing an oil-based carrier with organic waste material selected from the group consisting of organic garbage, raw sewage, sewage sludge and waste paper, said waste material containing at least about 10 weight percent water, the amount of oil-based carrier present being sufficient to permit the mixture to be a more readily flowable material than the corresponding waste material free of oil carrier, and pyrolyzing said flowable material at elevated temperature and pressure to produce said liquid oils.

2. The process of claim 1 in which said flowable material is passed in a substantially continuous stream through a heating and pressurizing zone to produce liquid oils in the resulting heated substantially continuous stream, and thereafter said heated, substantially continuous stream is passed through heat exchange means to recover heat and to transfer an upstream of it to the substantially continuous stream.

3. The process of claim 1 in which said readily flowable material is pyrolyzed at a temperature of 700° to 950° F.

4. The process of claim 3 in which said readily flowable material is pyrolyzed at a pressure of 700 to 2500 psi.

5. The process of claim 1 in which said readily flowable material contains from 60 to 90 weight percent of said oil carrier prior to pyrolysis.

6. The process of claim 1 in which each portion of the readily flowable material is exposed to pyrolysis at 750° to 900° F. and a pressure of 800 to 1500 psi. for an average period of time exceeding 5 minutes.

7. The process of claim 1 in which said organic waste material is sewage sludge.

8. The process of claim 1 in which said waste material contains about 30 to 60 weight percent of water.

9. The process of producing liquid oils from sewage sludge which contains from about 30 to 60 percent by weight of water, which comprises:
   mixing an oil-based carrier with said sewage sludge in a porportion to provide 60 to 90 weight percent of said oil-based carrier prior to pyrolysis to permit the mixture to be a more readily flowable material than sewage sludge free of oil carrier; and
   passing said readily flowable material in a substantially continuous stream through a heating and pressurizing zone at a temperature of 700° to 950° F. and a pressure of 700 to 2500 psi. for an average period of time exceeding 5 minutes for each portion of the readily flowable material, and thereafter passing said substantially continuous stream through heat exchange means to recover heat and to transfer it to an upstream portion of the substantially continuous stream.

10. The process of claim 9 in which each portion of the readily flowable material is exposed to pyrolysis at 750° to 900° F. and a pressure of 800 to 1500 psi. for an average period of time exceeding 5 minutes.

11. The process of producing liquid oils from undried municipal waste material having a water content of about 10 to 60 weight percent, which comprises:
    adding sufficient oil-based carrier to said municipal waste material to permit the mixture to be a more readily flowable material than the corresponding municipal waste material free of oil carrier;
    passing in a substantially continuous stream said undried municipal waste material through a heating and pressurizing zone to produce liquid oils in the resulting heated, substantially continuous stream, and thereafter passing said heated, substantially continuous stream through heat exchange means to recover heat and to transfer it to an upstream portion of the substantially continuous stream.

12. The process of claim 11 in which said undried municipal waste material is sewage sludge.

13. A process for the continuous hydrogenation of organic materials in sewage to liquid oils including the steps of: adding sewage containing approximately at least 40% water by weight, both entrained and organic material contained, to a flowing liquid carrier consisting predominantly of oils, elevating the temperature and pressure of the sewage-carrier mixture to approximately 800° to 900° F. and under 2000 psi. for a time sufficient to produce hydrogen from the reaction of the sewage water with the sewage-carrier mixture without the addition of external hydrogen, and to convert a substantial portion of the organic materials to yield oil, withdrawing at least a portion of the yield oil from the reformed mixture, and recirculating the remaining portion of the reformed mixture as carrier liquid and adding additional sewage thereto for continuous hydrogenation.

14. A process for the continuous hydrogenation of organic materials in sewage to liquid oils as defined in claim 13, wherein the step of elevating the temperature and pressure of the sewage carrier mixture is controlled to produce superheated steam to improve the production of hydrogen from the reaction of steam with the sewage-carrier mixture.

15. A process for the continuous hydrogenation of organic materials in sewage to liquid oils as defined in claim 13, wherein the sewage-carrier mixture is propelled by a reciprocating piston device through a reactor where heat is added to the mixture.

16. A process for the continuous hydrogenation of organic materials in sewage to liquid oils as defined in claim 15, wherein the reactor is a counterflow heat exchanger that directs the mixture after reaching maximum temperature in out-of-contact heat exchange relation with inflow mixture to the reactor.

17. The process of producing liquid oils from organic waste materials selected from the group consisting of organic garbage, raw sewage, sewage sludge, and waste paper, which comprises:
    mixing an oil-based carrier with organic waste material, said waste material containing at least about 10 weight percent water, the amount of oil-based carrier present being sufficient to permit the mixture to be a more readily flowable material than the corresponding waste material free of oil carrier, pyrolysing said flowable material at a temperature of 700° to 950° F. and a pressure of 700 to 2,500 p.s.i. to produce said liquid oils, and thereafter passing said heated, substantially continuous stream through heat exchange means to recover heat and to transfer it to an upstream portion of said substantially continuous stream.

18. The process of claim 17 in which said waste material contains from about 30 to 60 weight percent of water not counting the oil carrier present.

19. The process of claim 18 in which said readily flowable material contains from 60 to 90 weight percent of said oil carrier prior to pyrolysis.

20. The process of claim 19 in which each portion of the readily flowable material is exposed to pyrolysis at 750° to 900° F. and a pressure of 800 to 1500 p.s.i. for an average period of time exceeding 5 minutes.

21. The process of claim 20 in which said organic waste material is undried sewage sludge.

* * * * *